(12) United States Patent
Travisano et al.

(10) Patent No.: US 11,410,051 B2
(45) Date of Patent: Aug. 9, 2022

(54) SYSTEMS AND METHODS FOR GENERATING BLENDED VARIABLE IMPORTANCE MEASURES CORRESPONDING TO SPECIFIC TARGETS

(71) Applicant: XL Catlin, New York, NY (US)

(72) Inventors: Frank Travisano, New York, NY (US); Divyanshu Suri, Mumbai (IN); Jyotiman Singh, Metuchen, NJ (US)

(73) Assignee: XL CATLIN, New York, NY (US)

( * ) Notice: Subject to any disclaimer, the term of this patent is extended or adjusted under 35 U.S.C. 154(b) by 910 days.

(21) Appl. No.: 16/149,039

(22) Filed: Oct. 1, 2018

(65) Prior Publication Data

US 2020/0104725 A1  Apr. 2, 2020

Related U.S. Application Data

(60) Provisional application No. 62/739,285, filed on Sep. 30, 2018.

(51) Int. Cl.
  *G06N 5/02* (2006.01)
  *G06F 16/2457* (2019.01)
(52) U.S. Cl.
  CPC .......... *G06N 5/02* (2013.01); *G06F 16/24578* (2019.01)
(58) Field of Classification Search
  CPC ..... G06N 5/02; G06N 20/20; G06F 16/24578
  See application file for complete search history.

(56) References Cited

U.S. PATENT DOCUMENTS

| | | | | |
|---|---|---|---|---|
| 9,697,469 | B2* | 7/2017 | McMahon | G06N 20/20 |
| 10,348,768 | B2* | 7/2019 | Childress | G06N 5/003 |
| 10,963,817 | B2* | 3/2021 | Jordan | G06N 5/04 |
| 2010/0131314 | A1* | 5/2010 | Lo Yuk Ting | G06Q 10/063 |
| | | | | 705/7.11 |
| 2015/0379426 | A1* | 12/2015 | Steele | G06N 20/00 |
| | | | | 706/12 |
| 2018/0060738 | A1* | 3/2018 | Achin | G06N 20/00 |
| 2018/0262531 | A1* | 9/2018 | Childress | H04L 63/20 |

* cited by examiner

*Primary Examiner* — Phenuel S Salomon
(74) *Attorney, Agent, or Firm* — Sheppard, Mullin, Richter & Hampton LLP (57) ABSTRACT

Computing an influence measure by combining a rank of independent variables based on a first XGBoost ranking operation; a second rank of independent variables based on a first Random Forest (RF) ranking operation; a third rank of independent variables based on a first GBM ranking operation; a fourth rank of independent variables based on a first GLM ranking operation; a fifth rank of independent variables based on a second GLM ranking operation different from the first; a sixth rank of independent variables based on a second GBM ranking operation different from the first; a seventh rank of independent variables based on a second RF ranking operation different from the first; and an eighth rank of independent variables based on a second XGBoost ranking operation different from the first; and combining the ranks to correlate influence of a given variable on a target outcome.

27 Claims, 4 Drawing Sheets

SYSTEMS AND METHODS FOR GENERATING BLENDED VARIABLE IMPORTANCE MEASURES CORRESPONDING TO SPECIFIC TARGETS

TECHNICAL FIELD

The present disclosure is generally related to novel methods for predictive modeling, and some particular embodiments relate to new applications and combinations of linear and non-linear modeling operations that generate variable importance measures to identify outcome-predictive variables to be used in a next layer model.

BACKGROUND

Building predictive models to assess data and identify what pieces of data are associated with what outcomes or responses is an ongoing challenge. This challenge is further complicated and ever-increasing in complexity as the amount of data being processed and considered in such predictive models increases. Indeed, while the age of "big data," has opened the door to new insight, it has also opened the flood-gates to overwhelming volumes and types of data. Early modeling problems often contained less than one hundred independent variables to consider, while today's modeling problems often exceed more than one thousand independent variables to consider.

Making sense of this data, especially new types of data whose significance to a particular outcome or response in a given context is a challenge for which many approaches and models have been presented. In particular, several conventional approaches have been presented to aid in identifying which variables—among a number of potentially significant variables within a dataset—are the most significant in terms of their influence on a given outcome, or in terms of their anticipated influence on a predicted outcome.

However, none of these conventional methods provide adequate insight into variable importance that takes into account, inter alia, a combination of: historical trend consistency of variables, historical similarities between variables (with or without outliers), both linear and nonlinear trends with respect to a given response or category of responses, as well as differences in the metrics used in evaluating such data.

What is needed, therefore, is a more intelligent and efficient predictive model that meaningfully and practically addresses the foregoing weaknesses—i.e., meaningfully considers key factors indicative of variable significance without materially increasing workload.

BRIEF SUMMARY OF THE EMBODIMENTS

In accordance with embodiments of the present disclosure, a solution an example system may include: a memory; a processor electrically coupled with a non-transitory computer readable medium having machine readable instructions stored thereon, which, when executed by the processor, cause the system to: obtain a dataset; identify, for a predetermined target, a plurality of candidate independent variables from at least a portion of the dataset; apply a plurality of statistical models to the dataset, each of the plurality of statistical models operating on the dataset to compute a model-specific rank for one or more of the candidate independent variables, the model-specific rank for individual candidate independent variables corresponding to a measure of influence the individual candidate independent variable has on the target relative to the other candidate independent variables; and generate an influence score for each candidate independent variable for which a plurality of model-specific ranks were computed from the plurality of statistical models.

In some embodiments, the plurality of statistical models are selected from the group consisting of: an eXtreme Gradient Boosting (XGBoost) model; a random Forest (RF) model; a gradient boosted machine (GBM) model; a Generalized Linear Model (GLM) model. In some embodiments, the plurality of statistical models comprises one or more of: a univariate K-fold cross-correlated XGBoost model; a multivariate XGBoost model; a univariate K-fold cross-correlated Random Forest model; a multivariate Random Forest model; a univariate K-fold cross-correlated GBM; a multivariate GBM model; a univariate K-fold cross-correlated GLM model; and a univariate non-K-fold cross-correlated GLM model. In some embodiments, the plurality of statistical models comprises one or more of: a multivariate, bivariate, or univariate K-fold cross-correlated XGBoost model; a multivariate, bivariate, or univariate K-fold cross-correlated Random Forest model; a multivariate, bivariate, or univariate K-fold cross-correlated GBM model; a multivariate, bivariate, or univariate K-fold cross-correlated GLM model; and a univariate non-K-fold cross-correlated GLM model. In some embodiments, the plurality of statistical models comprises at least: a univariate K-fold cross-correlated XGBoost model; a multivariate XGBoost model; a univariate K-fold cross-correlated Random Forest model; a multivariate Random Forest model; a univariate K-fold cross-correlated GBM model; a multivariate GBM model; a univariate K-fold cross-correlated GLM model; and a univariate non-K-fold cross-correlated GLM model.

In some embodiments, the plurality of statistical models comprises at least: a univariate K-fold cross-correlated XGBoost model; a multivariate XGBoost model; a univariate K-fold cross-correlated Random Forest model; a multivariate Random Forest model; a univariate K-fold cross-correlated GBM model; a multivariate GBM model; a univariate K-fold cross-correlated GLM model; and a univariate non-K-fold cross-correlated GLM model.

In some embodiments, the plurality of statistical models consists of: a univariate K-fold cross-correlated XGBoost model; a multivariate XGBoost model; a univariate K-fold cross-correlated Random Forest model; a multivariate Random Forest model; a univariate K-fold cross-correlated GBM model; a multivariate GBM model; a univariate K-fold cross-correlated GLM model; and a univariate non-K-fold cross-correlated GLM model.

In some example embodiments, the influence score generated for each candidate independent variable is based on each of the plurality of model-specific ranks computed for each candidate independent variable. In some embodiments, the system is further comprises machine readable instructions, which, when executed by the processor, cause the system to effectuate one or more of the following: (i) sort the one or more candidate independent variables based upon their respective influence scores, (ii) identify the one or more candidate independent variables having an influence score satisfying a predetermined influence score threshold, (iii) generate a forecast model based on a subset of the dataset, the subset of the dataset comprising data within the dataset corresponding to the one or more candidate independent variables having an influence score satisfying the predetermined influence score threshold; and/or (iv) predict an outcome associated with the target, the outcome based on the forecast model.

In accordance with embodiments of the present disclosure, a solution is provided involving an example system, the system including one or more of: a memory; a processor electrically coupled with a non-transitory computer readable medium having machine readable instructions stored thereon, which, when executed by the processor, cause the system to: obtain a dataset; identify a plurality of independent variables from at least a portion of the dataset; generate a first rank of each variable of the plurality of independent variables based on a first eXtreme Gradient Boosting (XGBoost) ranking operation; generate a second rank of each variable of the plurality of independent variables based on a first Random Forest (RF) ranking operation; generate a third rank of each variable of the plurality of independent variables based on a first gradient boosted machine (GBM) ranking operation; generate a fourth rank of each variable of the plurality of independent variables based on a first Generalized Linear Model (GLM) ranking operation; generate a fifth rank of each variable of the plurality of independent variables based on a second GLM ranking operation; generate a sixth rank of each variable of the plurality of independent variables based on a second GBM ranking operation; generate a seventh rank of each variable of the plurality of independent variables based on a second RF ranking operation; generate an eighth rank of each variable of the plurality of independent variables based on a second XGBoost ranking operation; and generate a first blended rank for each of the plurality of variables based on the first rank, the second rank, the third rank, the fourth rank, the fifth rank, the sixth rank, the seventh rank, and the eighth rank of each variable.

In accordance with some embodiments of the present disclosure, an example system may further comprise machine-readable instructions, which, when executed by the processor, cause the system to: apply a first weighting factor to the first rank for each variable of the plurality of independent variables; apply a second weighting factor to the second rank for each variable of the plurality of independent variables; apply a third weighting factor to the third rank for each variable of the plurality of independent variables; apply a fourth weighting factor to the fourth rank for each variable of the plurality of independent variables; apply a fifth weighting factor to the fifth rank for each variable of the plurality of independent variables; apply a sixth weighting factor to the sixth rank for each variable of the plurality of independent variables; apply a seventh weighting factor to the seventh rank for each variable of the plurality of independent variables; and apply an eighth weighting factor to the eighth rank for each variable of the plurality of independent variables.

In accordance with some embodiments of the present disclosure, an example system further comprises machine readable instructions, which, when executed by the processor, cause the system to effectuate one or more of the following: (i) gather data associated with independent variables having a blended rank above a first significance threshold; and compute a risk score based on the data associated with independent variables having a blended rank above a first significance threshold; (ii) gather data associated with independent variables having a blended rank above a first significance threshold; and generate a forecast model based on the data associated with independent variables having a blended rank above a first significance threshold; (iii) generate a report based on the forecast model; (iv) generate a recommendation based on the forecast model; (v) generate an insurance policy provision recommendation based on the forecast model; (vi) generate an alert based on the forecast model; and (vii) identify a plurality of independent variables from at least a portion of the dataset.

In accordance with some embodiments of the present disclosure, the recommendation generated is further based upon a floating criteria. In some embodiments each of the factors are equal, while in other embodiments they are not. In some embodiments the weighting factors are dynamically applied based on a floating criteria.

In accordance with some embodiments of the present disclosure, the first XGBoost ranking operation is a univariate ranking operation, cross-correlated with a K-fold cross correlation, where K is greater than 2; the first Random Forest ranking operation is a univariate ranking operation, cross-correlated with a K-fold cross correlation, where K is greater than 2; the first GBM ranking operation is a univariate ranking operation, cross-correlated with a K-fold cross correlation, where K is greater than 2; the first GLM ranking operation is a univariate ranking operation, not cross-correlated with a K-fold cross correlation; the second GLM ranking operation is a univariate ranking operation, cross-correlated with a K-fold cross correlation, where K is greater than 2; the second GBM ranking operation is a multi-variate ranking operation; the second Random Forest ranking operation is a multivariate ranking operation; and the second XGBoost ranking operation is a multi-variate ranking operation.

In accordance with embodiments of the present disclosure, a solution is provided involving an example method, the method involving one or more of the steps of: obtaining a dataset; identifying a plurality of independent variables from at least a portion of the dataset; generating a first rank of each variable of the plurality of independent variables based on a first eXtreme Gradient Boosting (XGBoost) ranking operation; generating a second rank of each variable of the plurality of independent variables based on a first Random Forest (RF) ranking operation; generating a third rank of each variable of the plurality of independent variables based on a first gradient boosted machine (GBM) ranking operation; generating a fourth rank of each variable of the plurality of independent variables based on a first Generalized Linear Model (GLM) ranking operation; generating a fifth rank of each variable of the plurality of independent variables based on a second GLM ranking operation; generating a sixth rank of each variable of the plurality of independent variables based on a second GBM ranking operation; generating a seventh rank of each variable of the plurality of independent variables based on a second RF ranking operation; generating an eighth rank of each variable of the plurality of independent variables based on a second XGBoost ranking operation; and generating a first blended rank for each of the plurality of variables based on the first rank, the second rank, the third rank, the fourth rank, the fifth rank, the sixth rank, the seventh rank, and the eighth rank of each variable.

In accordance with embodiments, an example method of the present disclosure may involve: applying a first weighting factor to the first rank for each variable of the plurality of independent variables; applying a second weighting factor to the second rank for each variable of the plurality of independent variables; applying a third weighting factor to the third rank for each variable of the plurality of independent variables; applying a fourth weighting factor to the fourth rank for each variable of the plurality of independent variables; applying a fifth weighting factor to the fifth rank for each variable of the plurality of independent variables; applying a sixth weighting factor to the sixth rank for each variable of the plurality of independent variables; applying a seventh weighting factor to the seventh rank for each variable of the plurality of independent variables; applying an eighth weighting factor to the eighth rank for each variable of the plurality of independent variables; and wherein the first blended rank is generated based on the weighted first rank, the weighted second rank, the weighted third rank, the weighted fourth rank, the weighted fifth rank, the weighted sixth rank, the weighted seventh rank, and the weighted eighth rank of each variable.

In accordance with embodiments, an example method of the present disclosure may involve: gathering data associated with independent variables having a blended rank above a first significance threshold; and computing a risk score based on the data associated with independent variables having a blended rank above a first significance threshold; In accordance with some embodiments, an example method of the present disclosure may involve: gathering data associated with independent variables having a blended rank above a first significance threshold; generating a forecast model based on the data associated with independent variables having a blended rank above a first significance threshold.

In accordance with embodiments, an example method of the present disclosure may involve one or more of the following: (i) generating a report based on the forecast model; generating a recommendation based on the forecast model; (ii) generating an insurance policy provision recommendation based on the forecast model; (iii) generating an alert based on the forecast model (iv) identify a plurality of independent variables from at least a portion of the dataset.

In accordance with embodiments, the first XGBoost ranking operation is a univariate ranking operation, cross-correlated with a K-fold cross correlation, where K is greater than 2; the first Random Forest ranking operation is a univariate ranking operation, cross-correlated with a K-fold cross correlation, where K is greater than 2; the first GBM ranking operation is a univariate ranking operation, cross-correlated with a K-fold cross correlation, where K is greater than 2; the first GLM ranking operation is a univariate ranking operation, not cross-correlated with a K-fold cross correlation; the second GLM ranking operation is a univariate ranking operation, cross-correlated with a K-fold cross correlation, where K is greater than 2; wherein the second GBM ranking operation is a multi-variate ranking operation; the second Random Forest ranking operation is a multivariate ranking operation; and the second XGBoost ranking operation is a multi-variate ranking operation.

BRIEF DESCRIPTION OF THE DRAWINGS

The technology disclosed herein, in accordance with one or more various embodiments, is described in detail with reference to the included figures. The figures include drawings that are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
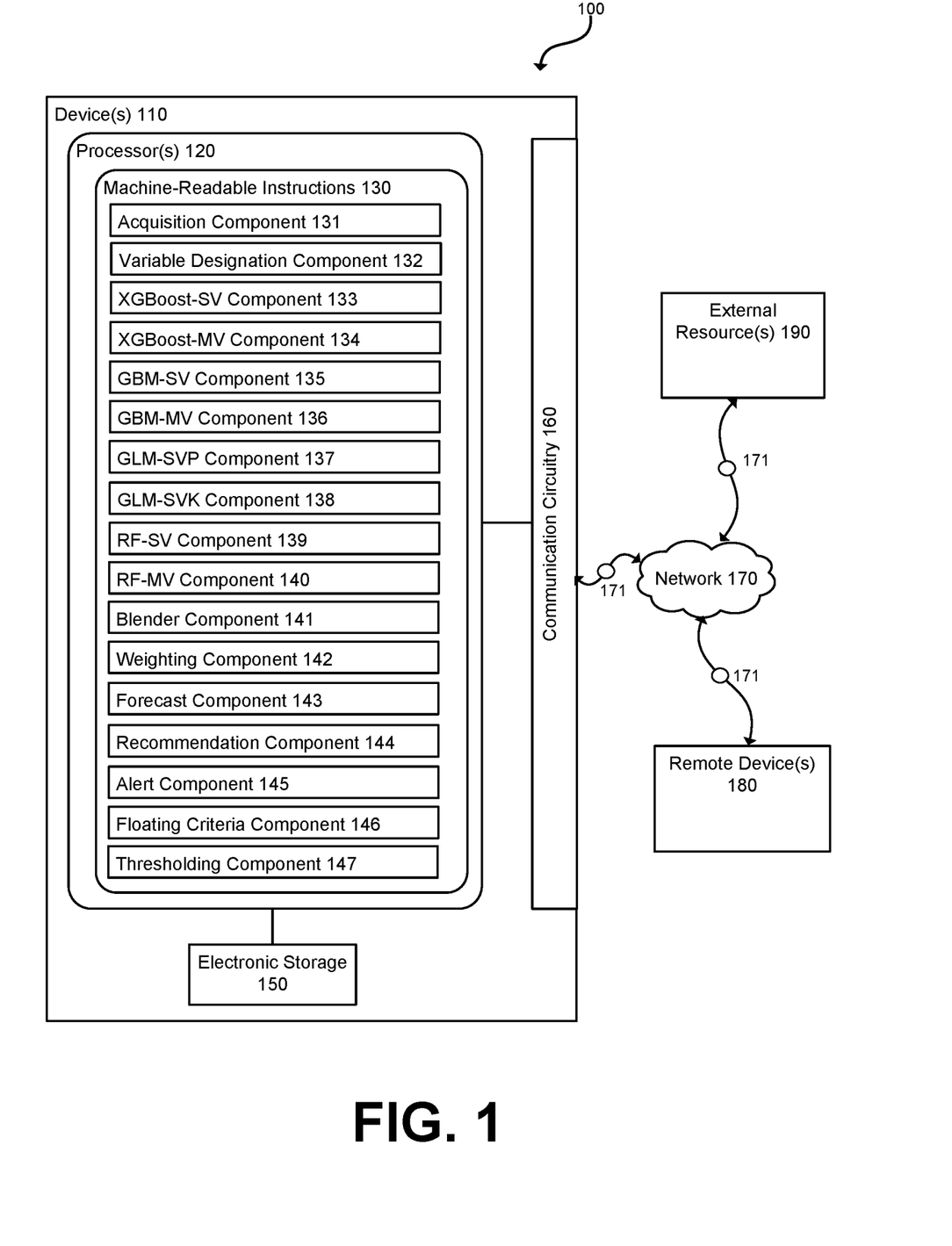
FIG. 1 illustrates an example system that may be implemented in accordance with one or more embodiments of the present disclosure.

FIG. 1 illustrates an example system that may be implemented in accordance with one or more embodiments of the present disclosure. As shown, system 100 may include device(s) 110 that include physical processor(s) 120, the physical processor(s) being configured by machine-readable instructions 130, including one or more components, to effectuate one or more of the features disclosed herein. Device(s) 110 may further include electronic storage 150, and communications circuitry 160, the communications circuitry configured to enable communications between device(s) 100, remote device(s) 180, and external resource(s) 190 over network 170.

Executing the machine-readable instructions 130 may cause the one or more physical processor(s) 120 to facilitate the application of enhanced modeling techniques leveraging multiple statistical models in particular combinations to identify the most significant variables. In some embodiments, the particular combinations are especially useful for targeting predictive variables associated with risk of exposure or liability in the insurance industry. As shown, the machine-readable instructions 130 may include one or more of an acquisition component 131, a variable designation component 132, an XGBoost-SV component 133, an XGBoost-MV component 134, a GBM-SV component 135, a GBM-MV component 136, a GLM-SVP component 137, a GLM-SVK component 138, an RF-SV component 139, an RF-MV component 140, a blending component 141, a weighting component 142, a forecast component 143, a recommendation component 144, an alert component 145, a floating criteria component 146, a thresholding component 147, and other components.

One or more features and/or functions of device(s) 110 may include generating a blended variable importance ranking in connection with a plurality of variables, where the blended variable importance ranking is generated, in whole or in part, based upon the hardware processor(s) 120 executing machine readable instructions corresponding to one or more of the components 131-147.

Acquisition component 131 may be configured to obtain a dataset from a source and make dataset information accessible to one or more other components of system 100. Acquisition component 131 may further be configured to store obtained datasets in one or more data repositories. Acquisition component 131 may obtain data responsive to a user prompted command, or based on an automated trigger (e.g., a preset or periodic pulling of data at a particular time and from a particular source). For example, acquisition component 131 may receive an indication from a user (e.g., by a user making selections via a computing device) that the user desired to load a particular dataset for blended variable importance assessment, and acquisition component 131 may responsively download the particular dataset from a source made available to it for such download (e.g., external resource(s) 190, remote device(s) 180 or other subsystems), and make the data accessible to one or more of the remaining components 132-147, or other components. Acquisition component 131 may further be configured to make obtained datasets available for access to one or more components simultaneously, in series in accordance with a predefined order, or in another arrangement based on a predetermined computing resource criteria. Acquisition component may be a standalone application that facilitates the download of dataset information in a specialized manner, or it may be integrated with another application.

Variable designation component 132 is configured to evaluate the dataset obtained by acquisition component 131 and identify a plurality of independent variables from at least a portion of the dataset. Variable designation component 132 may be configured to receive one or more commands from a user to aid in the identification and designation of the plurality of independent variables. In other embodiments, variable designation component 132 is configured to identify independent variables automatically from the dataset, based on one or more predetermined criteria.

XGBoost-SV component 133 is configured to apply univariate eXtreme Gradient Boosting (XGBoost) operations for each independent variable of the dataset, and generate a rank of one or more of the variables under consideration, in accordance with their importance (i.e., level of influence on an outcome). In some embodiments the rank is based, in whole or in part, on node impurity and Lift AUC. In some embodiments, XGBoost ranking operations comprise an implementation of gradient boosted decision tree algorithms, and may make a determination as to variable importance based on either weight, gain, or cover. Weight corresponds to the number of times a feature appears in the tree. Gain corresponds to the average gain of the number of splits that use the given feature. Cover corresponds to the average coverage of splits which use the given feature, with coverage referring to the number of samples affected by the split.

In some embodiments the univariate XGBoost operations are K-fold cross-validated. As will be appreciated by those skilled in the art, K-fold cross-validation involves randomly partitioning the original sample into K equal sized subsamples. Of the K subsamples, a single subsample is retained as the validation data for testing the model, and the remaining K−1 subsamples are used as training data. The cross-validation process is then repeated K times, and each of the K subsamples is used exactly once as the validation data. Ultimately, the K number of results may be averaged to produce a single estimation. Typically, in K-fold cross-validation all observations are used for both training and validation, and each observation is used for validation exactly once.

In some embodiments XGBoost-SV component 133 applies univariate XGBoost ranking operations on the dataset and performs 10-fold validation. In other embodiments, K may be greater than or less than 10. In some embodiments, K may be defined on-the-fly based on one or more other criteria, such a floating criteria (discussed in more detail herein with respect to floating criteria component 146.

In some embodiments, XGBoost operations may involve the creation of new models that predict residuals or errors of prior models, and may further consider the new models in the aggregate to make a final or semi-final prediction of variable importance. XGBoost operations may include application of a gradient descent algorithm to minimize loss when adding new models. Because XGBoost generally represents all problems as a regression predictive modeling problem that only takes numerical values as input, if the dataset includes values that are not numerical, XGBoost-SV component 133 may prepare the data (e.g., convert the data) to a numerical value before applying the ranking operation. In some embodiments, the modeling dataset is structured or tabular, and XGBoost is configured to perform classification and/or regression predictive modeling of the dataset.

XGBoost-MV component 134 is configured to apply a multi-variate XGBoost operation, again based on an implementation of gradient boosted decision tree algorithms. Unlike XGBoost-SV component 133, XGBoost-MV component 134 is configured to analyze two or more independent variables together to identify any possible associations or interactions therebetween. Based on the multi-variate XGBoost operations, XGBoost-MV component may generate a rank for one or more of the plurality of independent variables under consideration. In some embodiments the rank is based, in whole or in part, on node impurity and Lift AUC.

GBM-SV component 135 is configured to apply a univariate gradient boosting machine (GBM) operation for each independent variable of the dataset. In some embodiments, this involves constructing a forward stage-wise additive model by implementing gradient descent in function space. At each iteration, the direction of the steepest descent is determined based on a loss function. At each iteration, a regression tree model is fitted to predict the gradient. Additionally, in some embodiments the step length in the identified direction of steepest descent is determined by a line search. In some embodiments, a step length at each iteration is multiplied by a shrinkage factor (between 0 and 1). In some embodiments, GBM-SV component 135 may generate a rank of each independent variable of the plurality of independent variables based on the univariate boosted machine (GBM) ranking operation for each independent variable. In some embodiments the rank is based, in whole or in part, on node impurity and Lift AUC. In some embodiments the multivariate XGBoost operations are K-fold cross-validated.

GBM-MV component 136, is configured to apply a multivariate gradiant boosting machine (GBM) operations, which again may be based on a forward stage-wise additive model implementing gradient descent in function space. Unlike GBM-SV component 135, GBM-MV component 136 is configured to analyze two or more independent variables together to identify any possible associations or interactions therebetween. Based on the multi-variate GBM operations, GBM-MV component 136 component may generate a rank for one or more of the plurality of independent variables under consideration. In some embodiments the rank is based, in whole or in part, on node impurity and Lift AUC.

GLM-SVP component 137, is configured to apply a univariate general linear model (GLM) operation for each independent variable of the dataset. In general, univariate GLM operations provide regression analysis and variance analysis for one dependent variable by one or more factors and/or variables. In some embodiments the univariate GLM operations performed by GLM-SVP component 137 are not cross-validated. Based on the univariate GLM operations, GLM-SVP component 137 may generate a rank for one or more of the plurality of independent variables under consideration. In some embodiments rank is based, in whole or in part, on one or more of deviance reduction and lift AUC (area under the curve). In some embodiments rank is based, in whole or in part, on an error probability value, P.

GLM-SVK component 138, is configured to apply a univariate general linear model (GLM) operation for each independent variable of the dataset. In general, univariate GLM operations provide regression analysis and variance analysis for one dependent variable by one or more factors and/or variables. In some embodiments the univariate GLM operations are K-fold cross-validated. Based on the univariate GLM operations, GLM-SVP component 137 may generate a rank for one or more of the plurality of independent variables under consideration. In some embodiments rank is based, in whole or in part, on one or more of deviance reduction and lift AUC (area under the curve).

RF-SV component 139 may be configured to apply a univariate Random forest (RF) operation for each independent variable of the dataset. In some embodiments, applying a univariate Random forest comprises constructing a multitude of decision trees (e.g., at training time) and outputting the class that is the mode of the classes (classification) or mean prediction (regression) of the individual trees. In some embodiments, RF-SV component 139 may generate a rank of each independent variable of the plurality of independent variables based on the univariate RF-SV component 139 operation for one or more independent variables of the dataset. In some embodiments the rank is based, in whole or in part, on node impurity and Lift AUC. In some embodiments the univariate operations are K-fold cross-validated.

RF-MV component 140 may be configured to apply a multivariate Random forest (RF) operation for each independent variable of the dataset. In some embodiments, applying a multivariate Random forest comprises constructing a multitude of decision trees (e.g., at training time) and outputting the class that is the mode of the classes (classification) or mean prediction (regression) of the individual trees. In some embodiments, RF-SV component 139 may generate a rank of each independent variable of the plurality of independent variables based on the multivariate RF-MV component 140 operation for one or more independent variables of the dataset. In some embodiments the rank is based, in whole or in part, on node impurity and Lift AUC.

Blending component 142 may be configured to obtain variable ranking results from one or more of XGBoost-SV component 133, an XGBoost-MV component 134, a GBM-SV component 135, a GBM-MV component 136, a GLM-SVP component 137, a GLM-SVK component 138, an RF-SV component 139, and RF-MV component 140, and generate one or more blended rankings for each of the plurality of variables ranked. A blended ranking may be based on one or more combinations of the ranking results from one or more of the foregoing components. For example, blending component 142 may collect ranking results from each of the components for each of the ranked variables, and average together, on a variable-by-variable basis, the rankings across one or more, and in some cases all, of the models applied by the aforementioned components. Once a blended ranking for each variable has been computed, blending component 142 may sort the list of variables in order of their rank. For example, a sorting operation effectuated by blending component 142 may sort the list of variables in order of highest rank (i.e., the variables predicted to have the greatest influence on an outcome). In generating a blended ranking for the plurality of variables under consideration in a given scenario, blending component 142 may apply a weighted combination of the underlying rankings. For instance blending component 142 may compute a weighted average of the rank results across the various models applied, for each variable.

In some embodiments, blending component 142 may be configured to generate an influence score for each candidate independent variable for which a plurality of model-specific ranks were computed from the plurality of statistical models. The influence score generated for each candidate independent variable is based on each of the plurality of model-specific ranks computed for each candidate independent variable. An influence score (sometimes including or included within a blended rank) may correspond to a measure of influence the individual candidate independent variable has on particular outcome, response, risk measure, or event that has or may occur (individually or collectively, sometimes referred to herein as a "target"), relative to the other candidate independent variables.

Weighting the ranking inputs to the blended ranking determination allows the technology of the present disclosure to be even further refined for given contexts within which the present technology may be used. For example, a univariate RF model may be known to provide more accurate results than a univariate GLM in a given context. Thus, while each model may output a ranking of variables, the ranking of variables produced by the univariate RF model in this particular context may be weighted more heavily when generating a blended ranking. Blending component 142 may be informed as to which weighting parameters should be applied in what contexts, and to what degree, based on information provided to it or accessible via weighting component 141.

Weighting component 141, may be configured to receive and store various weighting parameters that may be applied by blending component 144 different contexts of interest. In some embodiments weighting component 141 may not have any weighting parameters associated with a given context or situation, and in that case may not provide any weighting parameters to blending component 140. In such a case, blending component 142 compute the blended rank for each independent variable by taking an average of the rankings (i.e., according equal weight to the rank result from each model for a given variable).

Figure 2:
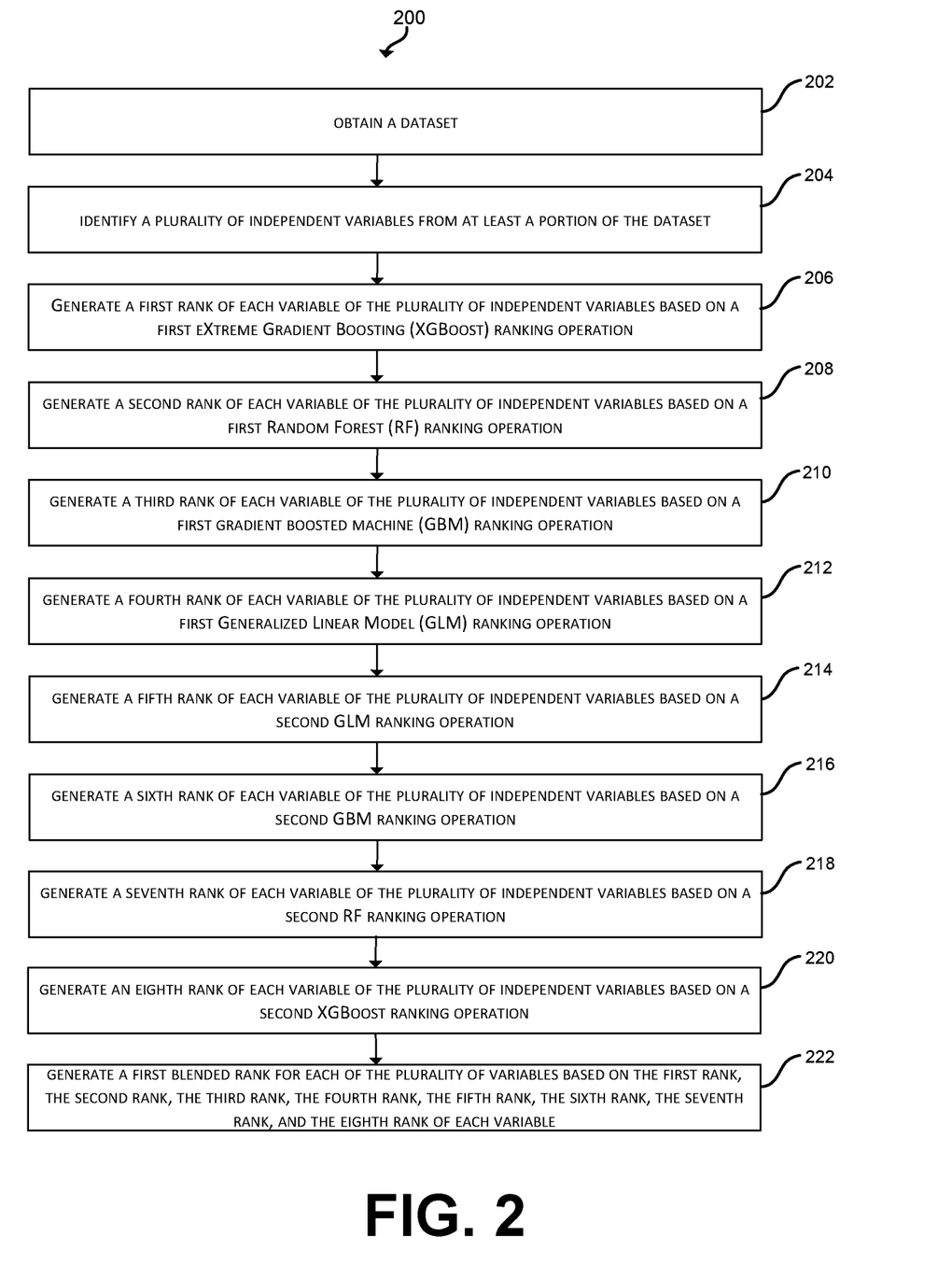
FIG. 2 illustrates an example method that may be implemented in accordance with one or more embodiments of the present disclosure.
Figure 3:
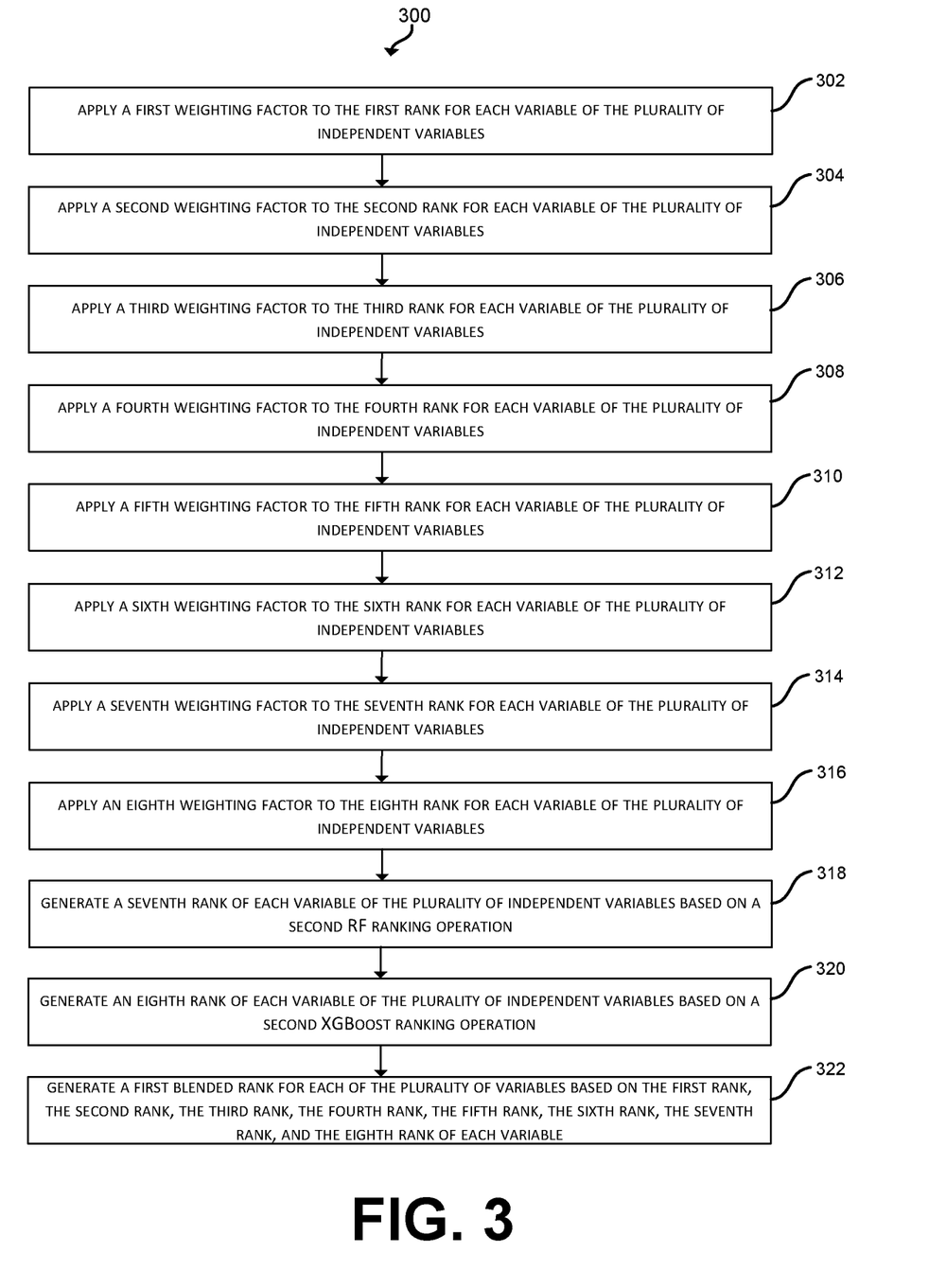
FIG. 3 illustrates an example method that may be implemented in accordance with one or more embodiments of the present disclosure.
Figure 4:
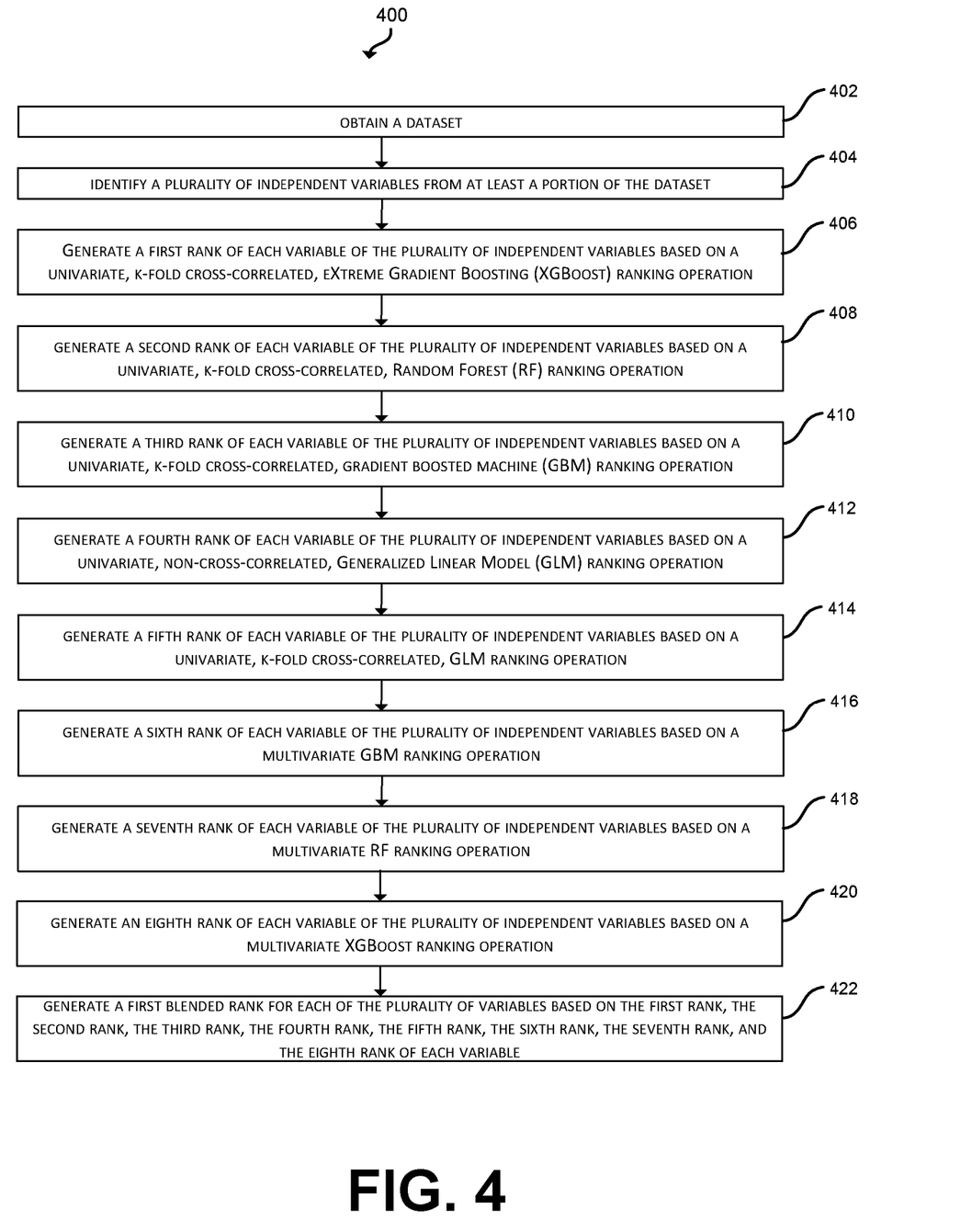
FIG. 4 illustrates an example method that may be implemented in accordance with one or more embodiments of the present disclosure.

FIGS. 2-4 illustrate example methods that may be implemented in accordance with one or more embodiments of the present disclosure, showing operational flow diagrams to effectuate generation of a blended rank for each evaluated variable, and in some instances a weighted blended rank.

As shown in FIG. 2, at operation 202, method 200 may obtain a dataset. At operation 204, method 200 may identify a plurality of independent variables from at least a portion of the dataset. At operation 206, method 200 may generate a first rank of each variable of the plurality of independent variables based on a first eXtreme Gradient Boosting (XGBoost) ranking operation. At operation 208, method 200 may generate a second rank of each variable of the plurality of independent variables based on a first Random Forest (RF) ranking operation. At operation 210, method 200 may generate a third rank of each variable of the plurality of independent variables based on a first gradient boosted machine (GBM) ranking operation. At operation 212, method 200 may generate a fourth rank of each variable of the plurality of independent variables based on a first Generalized Linear Model (GLM) ranking operation. At operation 214, method 200 may generate a fifth rank of each variable of the plurality of independent variables based on a second GLM ranking operation. At operation 216, method 200 may generate a sixth rank of each variable of the plurality of independent variables based on a second GBM ranking operation. At operation 218, method 200 may generate a seventh rank of each variable of the plurality of independent variables based on a second RF ranking operation. At operation 220, method 200 may generate an eighth rank of each variable of the plurality of independent variables based on a second XGBoost ranking operation. At operation 222, method 200 may generate a first blended rank for each of the plurality of variables based on the first rank, the second rank, the third rank, the fourth rank, the fifth rank, the sixth rank, the seventh rank, and the eighth rank of each variable.

FIG. 3 illustrates an example method that may be implemented in accordance with one or more embodiments of the present disclosure. In some embodiments, the method of FIG. 3 builds on the methods presented above with reference to FIG. 2. As shown in FIG. 3, at operation 302, method 300 may apply a first weighting factor to the first rank for each variable of the plurality of independent variables. At operation 304, method 300 may apply a second weighting factor to the second rank for each variable of the plurality of independent variables. At operation 306, method 300 may apply a third weighting factor to the third rank for each variable of the plurality of independent variables. At operation 308, method 300 may apply a fourth weighting factor to the fourth rank for each variable of the plurality of independent variables. At operation 310, method 300 may apply a fifth weighting factor to the fifth rank for each variable of the plurality of independent variables. At operation 312, method 300 may apply a sixth weighting factor to the sixth rank for each variable of the plurality of independent variables. At operation 314, method 300 may apply a seventh weighting factor to the seventh rank for each variable of the plurality of independent variables. At operation 316, method 300 may apply an eighth weighting factor to the eighth rank for each variable of the plurality of independent variables. At operation 318, method 300 may generate a seventh rank of each variable of the plurality of independent variables based on a second RF ranking operation. At operation 320, method 300 may generate an eighth rank of each variable of the plurality of independent variables based on a second XGBoost ranking operation. At operation 322, method 300 may generate a first blended rank for each of the plurality of variables based on the first rank, the second rank, the third rank, the fourth rank, the fifth rank, the sixth rank, the seventh rank, and the eighth rank of each variable.

FIG. 4 illustrates an example method that may be implemented in accordance with one or more embodiments of the present disclosure. In particular, FIG. 4 includes specific implementations of the models identified with respect to FIG. 3. Specifically, at operation 402, method 400 may obtain a dataset. At operation 404, method 400 may identify a plurality of independent variables from at least a portion of the dataset. At operation 406, method 400 may Generate a first rank of each variable of the plurality of independent variables based on a univariate, k-fold cross-correlated, eXtreme Gradient Boosting (XGBoost) ranking operation. At operation 408, method 400 may generate a second rank of each variable of the plurality of independent variables based on a univariate, k-fold cross-correlated, Random Forest (RF) ranking operation. At operation 410, method 400 may generate a third rank of each variable of the plurality of independent variables based on a univariate, k-fold cross-correlated, gradient boosted machine (GBM) ranking operation. At operation 412, method 400 may generate a fourth rank of each variable of the plurality of independent variables based on a univariate, non-cross-correlated, Generalized Linear Model (GLM) ranking operation. At operation 414, method 400 may generate a fifth rank of each variable of the plurality of independent variables based on a univariate, k-fold cross-correlated, GLM ranking operation. At operation 416, method 400 may generate a sixth rank of each variable of the plurality of independent variables based on a multivariate GBM ranking operation. At operation 418, method 400 may generate a seventh rank of each variable of the plurality of independent variables based on a multivariate RF ranking operation. At operation 420, method 400 may generate an eighth rank of each variable of the plurality of independent variables based on a multivariate XGBoost ranking operation. At operation 422, method 400 may generate a first blended rank for each of the plurality of variables based on the first rank, the second rank, the third rank, the fourth rank, the fifth rank, the sixth rank, the seventh rank, and the eighth rank of each variable.

Referring back now to FIG. 1, Forecast component 143 may be configured to generate a forecast model, the forecast model providing a predictive model (e.g., a regression or classification) pertaining to a particular target. The forecast model may be based on one or more candidate independent variables that have a blended rank or an influence score satisfying a predetermined blended rank threshold or influence score threshold, respectively. For example, forecast model may provide a predictive insight regarding a future outcome or response, based at least in part on the variables exceeding a certain blended rank threshold (e.g., the top ten most significant variables in the blended ranking).

For a given problem, a threshold may be provided, in whole or in part, as input from a user or other external resource. Thresholding component 147 may be configured to obtain such input from a user (or another source), and provide a threshold parameter to forecast component 143, thereby allowing the forecast component 143 to pare down the list of independent variables in a customized manner for the given context. In some embodiments, thresholding component 147 may compute a threshold parameter based at least in part on various criteria that may change or be changed from time-to-time. Such criteria is referred to herein as floating criteria. Floating criteria may take the form of a rule, and/or information that may be triggered by application of such a rule. Floating criteria may be defined by or via floating criteria component 146.

Accordingly, forecast component 143 may be configured to provide a prediction about a future event, occurrence, condition or response based on the blended ranking and/or influence score.

Recommendation component 144 may be configured to provide an automated recommendation based on the forecast. For example, if the forecast component 143 evaluates ten of the most significant risk factors in a dataset related to an insurance candidate's risk to make a particular type of claim, based on the blended ranking (and/or influence score), and generates a prediction that an undesirable condition would likely result and be financially unsound (e.g., from the perspective of the insurer), the recommendation component 144 may provide a recommendation to deny coverage in a given scenario, or to employ an enhanced policy provision to strike a more desirable balance in the risk profile. Alert component 145 may be configured to provide one or more alerts to a user based on the blended ranking (and/or influence score) and/or forecast model.

With regard to other elements of FIG. 1, device(s) 110 may include electronic storage 150. The device(s) 110 may include communication lines or ports to enable the exchange of information with a network and/or other entities. Illustration of device(s) 110 in FIG. 1 is not intended to be limiting. The device(s) 110 may include a plurality of hardware, software, and/or firmware components operating together to provide the functionality attributed herein to device(s) 110. For example, the device(s) 110 may be implemented by a cloud of computing platforms operating together as device(s) 110.

Electronic storage 150 may comprise electronic storage media that electronically stores information. The electronic storage media of electronic storage 150 may include one or both of system storage that is provided integrally (i.e., substantially non-removable) with device(s) 110 and/or removable storage that is removably connectable to device(s) 110 via, for example, a port or a drive. A port may include a USB port, a Firewire port, and/or other port. A drive may include a disk drive and/or other drive. Electronic storage 150 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 150 may include one or more virtual storage resources (e.g., cloud storage, a virtual private network, and/or other virtual storage resources). The electronic storage 150 may be configured to store software algorithms, information determined by processor(s) 120, information received from device(s) 110, information received from external resource(s) 190, and/or other information that enables device(s) 110 to function as described herein.

The system 100 may include an external resource(s) operatively linked via one or more electronic communication links 171. External resource(s) 190 may include sources of information, hosts, and/or other entities outside of system 100, external entities participating with system 100, computing platforms, and/or other resources. In some implementations, some or all of the functionality attributed herein to external resource(s) 190 may be provided by resources included in system 100.

It will be appreciated that this is not intended to be limiting and that the scope of this disclosure includes implementations in which device(s) 110, external resource(s) 190, and/or other entities may be operatively linked via some other communication media.

Processor(s) 120 may be configured to provide information-processing capabilities in device(s) 110. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include one or more processing units. These processing units may be physically located within the same device, or processor 120 may represent processing functionality of a plurality of devices operating in coordination. The processor 120 may be configured to execute components 131-147. Processor 120 may be configured to execute components 131-147 by software; hardware; firmware; some combination of software, hardware, and/or firmware; and/or other mechanisms for configuring processing capabilities on processor 120.

It should be appreciated that although components 131-147 are illustrated in FIG. 1 as being co-located within a single processing unit, in implementations in which processor 120 includes multiple processing units, one or more of components 131-147 may be located remotely from the other components. The description of the functionality provided by the different components 131-147 described above is for illustrative purposes and is not intended to be limiting, as any of components 131-147 may provide more or less functionality than is described. For example, one or more of components 131-147 may be eliminated, and some or all of its functionality may be provided by other ones of components 131-147 and/or other components. As an example, processor 120 may be configured to execute one or more additional components that may perform some or all of the functionality attributed below to one of components 131-147.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various component described herein might be implemented as discrete modules or the functions and features described can be shared in part or in total among one or more component. In other words, as would be apparent to one of ordinary skill in the art after reading this description, the various features and functionality described herein may be implemented in any given application and can be implemented in one or more separate or shared component in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
a memory;
a processor electrically coupled with a non-transitory computer readable medium having machine readable instructions stored thereon, which, when executed by the processor, cause the system to:
download a dataset from a remote device over a communications circuit coupling the processor to the remote device;
identify, for a predetermined target, a plurality of candidate independent variables from at least a portion of the dataset, wherein the predetermined target is insurance coverage exposure of an insurer;
apply a plurality of statistical models to the dataset, each of the plurality of statistical models operating on the dataset to compute a model-specific rank for one or more of the candidate independent variables, the model-specific rank for individual candidate independent variables corresponding to a measure of influence the individual candidate independent variable has on the target relative to the other candidate independent variables;
generate an influence score for each candidate independent variable for which a plurality of model-specific ranks were computed from the plurality of statistical models; and
wherein the plurality of statistical models are selected from the group consisting of: an eXtreme Gradient Boosting (XGBoost) model; a random Forest (RF) model; a gradient boosted machine (GBM) model; a Generalized Linear Model (GLM) model.

2. The system of claim 1, wherein the influence score generated for each candidate independent variable is based on each of the plurality of model-specific ranks computed for each candidate independent variable.

3. The system of claim 1, wherein the plurality of statistical models comprises one or more of: a univariate K-fold cross-correlated XGBoost model; a multivariate XGBoost model; a univariate K-fold cross-correlated Random Forest model; a multivariate Random Forest model; a univariate K-fold cross-correlated GBM; a multivariate GBM model; a univariate K-fold cross-correlated GLM model; and a univariate non-K-fold cross-correlated GLM model.

4. The system of claim 1, wherein the plurality of statistical models comprises at least: a univariate K-fold cross-correlated XGBoost model; a multivariate XGBoost model; a univariate K-fold cross-correlated Random Forest model; a multivariate Random Forest model; a univariate K-fold cross-correlated GBM; a multivariate GBM model; a univariate K-fold cross-correlated GLM model; and a univariate non-K-fold cross-correlated GLM model.

5. The system of claim 1, further comprising machine readable instructions, which, when executed by the processor, cause the system to:
sort the one or more candidate independent variables based upon their respective influence scores.

6. The system of claim 1, further comprising machine readable instructions, which, when executed by the processor, cause the system to:
identify the one or more candidate independent variables having an influence score satisfying a predetermined influence score threshold.

7. The system of claim 6, further comprising machine readable instructions, which, when executed by the processor, cause the system to:
generate a forecast model based on a subset of the dataset, the subset of the dataset comprising data within the dataset corresponding to the one or more candidate independent variables having an influence score satisfying the predetermined influence score threshold.

8. The system of claim 7, further comprising machine readable instructions, which, when executed by the processor, cause the system to:
predicting an outcome associated with the target, the outcome based on the forecast model.

9. A method, comprising:
downloading a dataset from a remote device over a communications circuit coupling the processor to the remote device;
identifying, for a predetermined target, a plurality of independent variables from at least a portion of the dataset, wherein the predetermined target is insurance coverage exposure of an insurer;

generating a first rank of each variable of the plurality of independent variables based on a first eXtreme Gradient Boosting (XGBoost) ranking operation;
generating a second rank of each variable of the plurality of independent variables based on a first Random Forest (RF) ranking operation;
generating a third rank of each variable of the plurality of independent variables based on a first gradient boosted machine (GBM) ranking operation;
generating a fourth rank of each variable of the plurality of independent variables based on a first Generalized Linear Model (GLM) ranking operation;
generating a fifth rank of each variable of the plurality of independent variables based on a second GLM ranking operation;
generating a sixth rank of each variable of the plurality of independent variables based on a second GBM ranking operation;
generating a seventh rank of each variable of the plurality of independent variables based on a second RF ranking operation;
generating an eighth rank of each variable of the plurality of independent variables based on a second XGBoost ranking operation; and
generating a first blended rank for each of the plurality of variables based on the first rank, the second rank, the third rank, the fourth rank, the fifth rank, the sixth rank, the seventh rank, and the eighth rank of each variable.

10. The method of claim 9, further comprising:
applying a first weighting factor to the first rank for each variable of the plurality of independent variables;
applying a second weighting factor to the second rank for each variable of the plurality of independent variables;
applying a third weighting factor to the third rank for each variable of the plurality of independent variables;
applying a fourth weighting factor to the fourth rank for each variable of the plurality of independent variables;
applying a fifth weighting factor to the fifth rank for each variable of the plurality of independent variables;
applying a sixth weighting factor to the sixth rank for each variable of the plurality of independent variables;
applying a seventh weighting factor to the seventh rank for each variable of the plurality of independent variables;
applying an eighth weighting factor to the eighth rank for each variable of the plurality of independent variables;
and wherein the first blended rank is generated based on the weighted first rank, the weighted second rank, the weighted third rank, the weighted fourth rank, the weighted fifth rank, the weighted sixth rank, the weighted seventh rank, and the weighted eighth rank of each variable.

11. The method of claim 9, further comprising:
gathering data associated with independent variables having a blended rank above a first significance threshold, the first significance threshold based on user input;
computing a risk score based on the data associated with independent variables having a blended rank above a first significance threshold.

12. The method of claim 9, further comprising:
gathering data associated with independent variables having a blended rank above a first significance threshold; and
generating a forecast model based on the data associated with independent variables having a blended rank above a first significance threshold.

13. The method of claim 12, further comprising:
generating a report based on the forecast model.

14. The method of claim 12, further comprising:
generating a recommendation based on the forecast model.

15. The method of claim 14, wherein the recommendation generated is further based upon a floating criteria.

16. The method of claim 12, further comprising:
generating an insurance policy provision recommendation based on the forecast model.

17. The method of claim 12, further comprising:
generating an alert based on the forecast model.

18. The method of claim 10, wherein each of the weighting factors are equal.

19. The method of claim 10, wherein each of the weighting factors are dynamically applied based on a floating criteria.

20. The method of claim 9, wherein the first XGBoost ranking operation is a univariate ranking operation, cross-correlated with a K-fold cross correlation, where K is greater than 2.

21. The method of claim 9, wherein the first Random Forest ranking operation is a univariate ranking operation, cross-correlated with a K-fold cross correlation, where K is greater than 2.

22. The method of claim 9, wherein the first GBM ranking operation is a univariate ranking operation, cross-correlated with a K-fold cross correlation, where K is greater than 2.

23. The method of claim 9, wherein the first GLM ranking operation is a univariate ranking operation, not cross-correlated with a K-fold cross correlation.

24. The method of claim 9, wherein the second GLM ranking operation is a univariate ranking operation, cross-correlated with a K-fold cross correlation, where K is greater than 2.

25. The method of claim 9, wherein the second GBM ranking operation is a multi-variate ranking operation.

26. The method of claim 9, wherein the second Random Forest ranking operation is a multivariate ranking operation.

27. The method of claim 9, wherein the second XGBoost ranking operation is a multi-variate ranking operation.

* * * * *